Patented Feb. 21, 1939

2,147,971

UNITED STATES PATENT OFFICE 2,147,971

SULPHUR DYESTUFFS FROM CARBAZOLE-INDOPHENOLS AND PROCESS OF MAKING SAME

Ernst Duer, Basel, Switzerland, assignor to the firm Society of Chemical Industry in Basle, Basel, Switzerland No Drawing. Application March 6, 1937, Serial No. 129,518. In Switzerland March 11, 1936

9 Claims. (Cl. 260—130)

This invention relates to the manufacture of new intermediate products by treating with an acid, preferably with a dilute mineral acid, for example aqueous hydrochloric acid, sulphuric acid or phosphorous acid of 1 to 10 per cent. strength, an indophenol obtainable by condensing a carbazole with a nitrosophenol or quinone-chlorimide; these products may be converted by means of sulphur into valuable dyestuffs distinguished by their properties of fastness, in particular fastness to chlorine. The conversion by means of sulphur comprises the various methods which have hitherto been recommended for converting indophenols or leuco indophenols into sulphur dyestuffs. Such methods are for example the baking with sulphur, preferably in the presence of polysulphides, the boiling with polysulphides in the presence of suitable liquids, such as water, ethyl alcohol, higher alcohols, for example amyl alcohol or cyclohexanol.

The new dyestuffs, the constitution of which is not known, are dark powders insoluble in water. With sodium sulphide they are converted into water-soluble, brown to dull grey-brown to grey-black colored vats, from which cotton is dyed dark blue, black and green shades having the above named properties of fastness. The new products dissolve in concentrated sulphuric acid to grey to grey-blue and grey-green solutions.

The following examples illustrate the invention, the parts being by weight; the ratio between parts by volume and parts by weight is that which exists between the liter and the kilogram:—

Example 1

13.5 parts of the indophenol from carbazole and para-nitroso-phenol are introduced into 300 parts by volume of sulphuric acid of 2 per cent. strength and the mixture is heated whilst stirring at 60-70° C. A feeble odor of quinone is developed and the indophenol which is soluble to a violet solution in alcohol passes into a sandy product insoluble in alcohol, alkalies and alkali sulphides. After about 30 minutes the change is complete; filtration and drying follow.

Similar products are obtained by subjecting other indophenols such as those from carbazole and nitroso-ortho-cresol or 1:2-benzocarbazole and quinone-chlorimide or 1:2-naphthocarbazole and quinone-chlorimide to a similar treatment.

Example 2

13.5 parts of the product of the first paragraph of Example 1 are introduced into a poly-sulphide solution made by dissolving 6 parts of sulphur in 15 parts of crystallized sodium sulphide. After 9 parts of sulphur and 5 parts of common salt have been added to the mixture the whole is dried in a vacuum at 80-85° C. The mass thus obtained is finely ground and baked for 3 hours at 210-230° C. By dissolving the baked product in water with addition of some sodium sulphide and blowing air through the solution thus obtained there is produced a dyestuff which is a dark powder and dissolves in sulphuric acid to a grey-blue solution and which dyes cotton in a grey-black colored sodium sulphide bath black shades fast to chlorine.

The sulphur dyestuff made in similar manner from the indophenol from carbazole and nitroso-ortho-cresol (which dyestuff is a dark powder dissolving in sulphuric acid to a grey-green solution) dyes cotton in a grey-brown colored sodium sulphide bath grey-green and that from the indophenol from 1:2-benzocarbazole or 1:2-naphthocarbazole and quinone-chlorimide (which dyestuff is a dark powder dissolving in sulphuric acid to a yellow-grey solution) in a grey colored sodium sulphide bath green tints.

If the sulphurization is carried out under other conditions there are obtained final products which have somewhat shifted properties. If, for example, the product of the first paragraph of Example 1 is sulphurized in alcohol or cyclohexanol with polysulphide, there is obtained a product dyeing blue-black tints.

Example 3

Cotton is dyed in the manner usual when using sulphur dyestuffs with 5-6 per cent. of the product of Example 2, 25 per cent. of sodium sulphide, 5 grams of calcined sodium carbonate per liter of liquor and 25 grams of calcined Glaubers salt per liter of liquor, the liquor ratio being 1:20. First the dyestuff is boiled with the 10 times diluted sodium sulphide solution as well as with the 10 times diluted sodium carbonate solution until the dyestuff is dissolved. The dyestuff solution is then added to the dye liquor at 60° C., the goods are entered and the temperature is raised to nearly boiling point. The Glaubers salt is then added and dyeing is continued for 1 hour. The yarn is now withdrawn, wrung out and suspended in air for oxidation. It is finally thoroughly rinsed and dried.

What I claim is:—

1. In the manufacture of sulphur dyestuffs from indophenols from nitrosophenol and carbazoles, the step which comprises reacting the indophenols previous to the sulphurization with dilute aqueous mineral acids of 1–10% strength until they are converted into products which are insoluble in alcohol.

2. In the manufacture of sulphur dyestuffs from the indophenol from nitrosophenol and carbazole, the step which comprises reacting the indophenol previous to the sulphurization with dilute aqueous mineral acids of 1–10% strength until it is converted into a product which is insoluble in alcohol.

3. Process for the manufacture of new sulphur dyestuffs, which comprises reacting the indophenols from carbazoles and nitrosophenols first with dilute aqueous mineral acid of 1–10% strength until the indophenol soluble in alcohol is converted into a product which is insoluble in alcohol, and then converting the transformation products thus obtained into sulphur dyestuffs by heating with sulphur in the presence of sodium polysulphide at temperatures lying between 100 and 250° C.

4. Process for the manufacture of new sulphur dyestuffs, which comprises reacting the indophenol from carbazole and nitrosophenol first with dilute aqueous mineral acid of 1–10% strength until the indophenol soluble in alcohol is converted into a product which is insoluble in alcohol, and then converting the transformation product thus obtained into sulphur dyestuffs by baking with sulphur in the presence of sodium polysulphide.

5. The sulphur dyestuffs which can be obtained by reacting the indophenols from carbazoles and nitrosophenols first with dilute aqueous mineral acid of 1–10% strength until the indophenol soluble in alcohol is converted into a product which is insoluble in alcohol, and then converting the transformation products thus obtained into sulphur dyestuffs by heating with sulphur in the presence of sodium polysulphide at temperatures lying between 100 and 250° C., which products are dark powders dissolving in sodium sulphide solution to grey-brown to grey-black solutions and in concentrated sulphuric acid to grey to grey-blue and grey-green solutions, and dyeing cotton from a sodium sulphide bath fast dark blue to dark green and dark black shades which are particularly fast to chlorine.

6. The sulphur dyestuffs which can be obtained by reacting the indophenol from carbazole and nitrosophenol first with dilute aqueous mineral acid of 1–10% strength until the indophenol soluble in alcohol is converted into a product which is insoluble in alcohol, and then converting the transformation product thus obtained into sulphur dyestuffs by heating with sulphur in the presence of sodium polysulphide at temperatures lying between 100 and 250° C., which products are dark powders dissolving in sodium sulphide solution to green-black solutions and in concentrated sulphuric acid to grey-blue solutions, and dyeing cotton from a sodium sulphide bath fast blue-black to black shades which are particularly fast to chlorine.

7. The sulphur dyestuff obtained by reacting the indophenol from carbazole and nitrosophenol first with dilute aqueous mineral acid of 1–10% strength until the indophenol soluble in alcohol is converted into a product which is insoluble in alcohol, and then converting the transformation product thus obtained into a sulphur dyestuff by baking with sulphur in the presence of sodium polysulphide, which product is a dark powder dissolving in sodium sulphide solution to a grey-black solution and in sulphuric acid to a grey-blue solution, and dyeing cotton in a sodium sulphide bath black shades fast to chlorine.

8. The sulphur dyestuffs which can be obtained by sulphurizing with sulphur in the presence of alkali polysulphides and at temperatures lying between 100 and 250° C. the reaction products formed by reacting the indophenols from carbazoles and nitrosophenols with aqueous mineral acids of 1 to 10% strength until the indophenols soluble in alcohol are converted into products which are insoluble in alcohol, which products are dark powders dissolving in sodium sulphide solution to grey-brown to grey-black solutions and in concentrated sulphuric acid to grey to grey-blue and grey-green solutions, and dyeing cotton from a sodium sulphide bath fast dark blue to dark green and dark black shades which are particularly fast to chlorine.

9. The sulphur dyestuffs which can be obtained by sulphurizing with sulphur in the presence of alkali polysulphides and at temperatures lying between 100 and 250° C. the reaction product formed by reacting the indophenol from carbazoles and nitrosophenol with aqueous mineral acids of 1 to 10% strength until the indophenol soluble in alcohol is converted into a product which is insoluble in alcohol, which products are dark powders dissolving in sodium sulphide solution to green-black solutions and in concentrated sulphuric acid to grey-blue solutions, and dyeing cotton from a sodium sulphide bath fast blue-black to black shades which are particularly fast to chlorine.

ERNST DUER.